(12) United States Patent
Takigahira (10) Patent No.: US 8,991,716 B2
(45) Date of Patent: Mar. 31, 2015

(54) ANTENNA AND WIRELESS TAG

(71) Applicant: Fujikura Ltd., Koto-ku, Tokyo (JP)

(72) Inventor: Masato Takigahira, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 14/157,747

(22) Filed: Jan. 17, 2014

(65) Prior Publication Data

US 2014/0131456 A1 May 15, 2014

Related U.S. Application Data

(63) Continuation of application No. PCT/JP2012/068518, filed on Jul. 20, 2012.

(30) Foreign Application Priority Data

Jul. 20, 2011 (JP) ................. 2011-159217

(51) Int. Cl.
| | | |
|---|---|---|
| G06K 19/00 | (2006.01) | |
| G06K 19/077 | (2006.01) | |
| G06K 19/07 | (2006.01) | |
| H01Q 13/10 | (2006.01) | |
| H01Q 1/22 | (2006.01) | |
| H01Q 1/38 | (2006.01) | |
| H01Q 9/42 | (2006.01) | |

(52) U.S. Cl.
CPC .......... *G06K 19/07773* (2013.01); *G06K 19/07* (2013.01); *G06K 19/077* (2013.01); *H01Q 13/10* (2013.01); *H01Q 1/2225* (2013.01); *H01Q 1/38* (2013.01); *H01Q 9/42* (2013.01)

USPC .......................................... 235/492; 235/487

(58) Field of Classification Search
USPC ............. 235/487, 492; 340/10, 572; 343/746, 343/767–771
See application file for complete search history.

(56) References Cited

U.S. PATENT DOCUMENTS

| | | | |
|---|---|---|---|
| 6,774,853 B2 * | 8/2004 | Wong et al. | 343/700 MS |
| 2006/0290572 A1 * | 12/2006 | Chan | 343/700 MS |
| 2009/0121957 A1 | 5/2009 | Kaneko et al. | |
| 2010/0060530 A1 * | 3/2010 | Shoji | 343/702 |
| 2010/0090919 A1 | 4/2010 | Kaneko et al. | |

FOREIGN PATENT DOCUMENTS

| | | |
|---|---|---|
| CN | 1893182 A | 1/2007 |
| CN | 101714698 A | 5/2010 |
| JP | 50-2843 A | 1/1975 |
| JP | 03-181208 A | 8/1991 |

(Continued)

OTHER PUBLICATIONS

Notice of Allowance in corresponding Japanese Application No. 2013-522036 dated Dec. 10, 2013.

(Continued)

*Primary Examiner* — Matthew Mikels
(74) *Attorney, Agent, or Firm* — Sughrue Mion, PLLC (57) ABSTRACT

A notch antenna (1) in accordance with the present invention includes: a conductor plate (11) divided into an inner region (11a) and an outer region (11b) by a notch (12); and a shortening capacitor (14) that bridges the inner region (11a) and the outer region (11b). This makes it possible to reduce the total length of the notch (12) to less than λ/4 where λ is a resonant wavelength of the notch antenna (1).

13 Claims, 9 Drawing Sheets

(56) References Cited

FOREIGN PATENT DOCUMENTS

| | | | |
|---|---|---|---|
| JP | 08-222943 | A | 8/1996 |
| JP | 2004-336328 | A | 11/2004 |
| JP | 2006-005836 | A | 1/2006 |
| JP | 2006-140735 | A | 6/2006 |
| JP | 2008-061158 | A | 3/2008 |
| JP | 2009-105993 | A | 5/2009 |
| JP | 2011-070642 | A | 4/2011 |
| TW | 200701555 | A | 1/2007 |

OTHER PUBLICATIONS

Office Action in corresponding Japanese Application No. 2013-522036 dated Aug. 6, 2013.
International Preliminary Report on Patentability in PCT Application No. PCT/JP2012/068518 dated Jan. 30, 2014.
International Search Report for PCT/JP2012/068518 dated Oct. 23, 2012.
Communication dated Dec. 2, 2014 from the State Intellectual Property Office of the People's Republic of China in counterpart application No. 201280035671.0.

* cited by examiner

ANTENNA AND WIRELESS TAG

CROSS-REFERENCE TO RELATED APPLICATIONS

This application is a Continuation of PCT International Application No. PCT/JP2012/068518 filed in Japan on Jul. 20, 2012, which claims the benefit of Patent Application No. 2011-159217 filed in Japan on Jul. 20, 2011, the entire contents of which are hereby incorporated by reference.

TECHNICAL FIELD

The present invention relates to an antenna and a wireless tag device including an antenna.

BACKGROUND ART

In recent years, an RFID (Radio Frequency Identification) system has been widely used for various purposes. The RFID system includes a wireless tag and a reader, and performs various functions via wireless communications between the tag and the reader.

The wireless tag for use in the RFID system is categorized into a passive tag that contains no battery and an active tag that contains a battery. The passive tag is used as a wireless tag for wireless communications between itself and a reader that is close to it (e.g., for use as a pre-paid card). On the other hand, the active tag is used as a wireless tag for wireless communications between itself and a reader that is not close to it (e.g., for use as a tag carried by a user in a presence management system or as a tag attached to a commercial product in an inventory management system). The presence management system is disclosed in, for example, Patent Literature 1.

It is necessary that the wireless tag include an antenna for wireless communications between itself and a reader. As the antenna included in the wireless tag, an antenna including a linear antenna element is often used, such as a loop antenna, a dipole antenna or a monopole antenna.

However, when such an antenna is mounted in or on the wireless tag, it may be necessary that the antenna element be positioned so as to run along an edge of the wireless tag. In particular, in a case where it is desired that the antenna operate in a low frequency band (low resonant frequency), the total length of the antenna element is necessarily long. Therefore, in such a case, the antenna element is more likely to be positioned so as to run along an edge of the wireless tag. However, edges of the wireless tag often make contact with an external conductor (e.g., user's finger). In this case, if the antenna element is positioned so as to run along an edge of the wireless tag, the external conductor may interfere with an electric field around the antenna element and thereby antenna characteristics may deteriorate.

As an antenna less prone to this problem, there has been known a notch antenna constituted by a conductor plate having a notch. As a notch antenna that can be mounted in or on a wireless tag, for example, there has been known an antenna disclosed in Patent Literature 2. The notch antenna is a planar antenna. Also because of this, the notch antenna is suitable for use in a card-shaped active tag.

CITATION LIST

Patent Literatures

Patent Literature 1
Japanese Patent Application Publication, Tokukai, No. 2011-70642 A (Publication Date: Apr. 7, 2011)

Patent Literature 2
Japanese Patent Application Publication, Tokukai, No. 2006-140735 A (Publication Date: Jun. 1, 2006)

SUMMARY OF INVENTION

Technical Problem

In order for a wireless tag to comply with laws and regulations such as the Radio Act, it is often necessary that an antenna included in the tag operate in a low frequency band (low resonant frequency). However, if a card-shaped wireless tag including a notch antenna is designed to operate in a lower frequency band, the antenna should become larger. Therefore, a card-shaped wireless tag including a notch antenna cannot meet a demand for downsizing the wireless tag.

Figure 10:
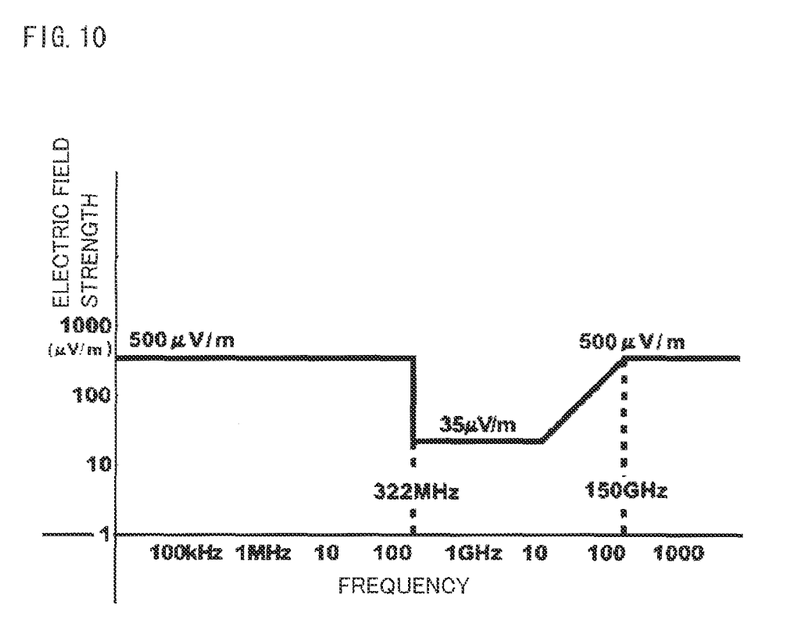
FIG. 10 is a graph showing the maximum electric field strength allowed for low power radio stations, which is specified in a law and a registration (Article 4 of the Radio Act and Article 6 of Regulations for Enforcement of the Radio Act) in Japan.

For example, in Japan, the maximum electric field strength allowed for low power radio stations such as a wireless tag is specified as shown in FIG. 10 (refer to Article 4 of the Radio Act and Article 6 of Regulations for Enforcement of the Radio Act). Specifically, in a frequency band of 322 MHz and lower, the use of a low power radio station without a license is permitted provided that the electric field strength (technically, the electric field strength at 3 meters from the low power radio station) is 500 µV/m or less; on the other hand, in a frequency band of not lower than 322 MHz but not higher than 10 GHz, the use of an extremely low power station is not permitted without a license if the electric field strength is greater than 35 µV/m. If the electric field strength is reduced to equal or less than 35 µV/m, at worst, an electromagnetic wave may not be strong enough even at a distance of 1 meter from the low power radio station. Such a low power radio station is not practical. In a frequency band of higher than 10 GHz, the electric field strength greater than 35 µV/m is permitted. However, as the frequency increases, it becomes more difficult to produce parts that constitute the low power radio station. In particular, parts for a low power radio station that operates in a frequency band of 60 GHz and higher have not been put in practical use as of now. Therefore, in order to realize a wireless tag that is easily accessible to everyone, it is preferable that an antenna included in the wireless tag has an operating frequency band of 322 MHz and lower.

However, for example, in order to cause the notch antenna disclosed in Patent Literature 2 to have a resonant wavelength of λ, it is necessary to make a notch which is bent at a distance of λ/4 from an edge of the conductor plate and whose total length is λ/2. That is, in order to cause the notch antenna disclosed in Patent Literature 2 to operate at 322 MHz, it is necessary to make a notch which is bent at a distance of 23.3 cm or more from an edge of the conductor plate and whose total length is 46.6 cm or greater. Therefore, with the use of the notch antenna disclosed in Patent Literature 2, it is not possible to meet the demand for reducing the size of a wireless tag to 85.6 mm×54.0 mm.

It should be noted that the above-mentioned size, i.e., 85.6 mm×54.0 mm (more technically, 85.60 mm×53.98 mm), is the size of a card specified as ID-1 in ISO/IEC7810. This size is often used for a passive tag such as an e-cash card. The size of an ID-1 card has a golden aspect ratio. Therefore, it looks good and also is internationally recognized as the size of a card that can be easily handled by humans. If it was possible to realize an active tag having the size of an ID-1 card, that would be ideal. However, as described earlier, it is difficult to realize an active tag having the size of an ID-1 card with the use of an existing notch antenna.

The present invention has been made in view of the above problems, and an object of the present invention is to realize an antenna having a notch whose total length is short. In particular, an object of the present invention is to realize an antenna suitable for use in a thin, small wireless tag.

Solution to Problem

In order to attain the above object, an antenna in accordance with the present invention includes: a conductor plate having a notch, the conductor plate being divided into a first region and a second region by the notch and having a power feed point at one end of the notch; and a capacitor that bridges the first region and the second region.

The antenna in accordance with the present invention includes the conductor plate divided into the first region and the second region by the notch, and there is a power feed point at one end of the notch. Therefore, the antenna in accordance with the present invention serves as a notch antenna that is complementary to a monopole antenna. Furthermore, the antenna in accordance with the present invention includes the capacitor that bridges the first region and the second region. This makes it possible to reduce, to less than $\lambda/4$, the total length of the notch of the antenna which has a resonant wavelength of $\lambda$. In other words, it is possible to increase, to greater than $4\rho$, the resonant wavelength of the antenna which has the notch whose total length is $\rho$.

It should be noted that the definition of the "divided" recited in claims at least includes both of the following: "the conductor plate is divided such that it is discontinuous when viewed from above"; and "the conductor plate is divided such that it is discontinuous when viewed from side".

Advantageous Effects of Invention

As described above, an antenna in accordance with the present invention is an antenna including: a conductor plate having a notch, the conductor plate being divided into a first region and a second region by the notch and having a power feed point at one end of the notch; and a capacitor that bridges the first region and the second region. Therefore, it is possible to reduce, to less than $\lambda/4$, the total length of a notch of a notch antenna which has a resonant wavelength of $\lambda$.

BRIEF DESCRIPTION OF DRAWINGS

(a) of FIG. 2 is a top view illustrating a structure of a notch of the notch antenna illustrated in FIG. 1. (b) of FIG. 2 is a top view illustrating a structure of a notch of a conventional notch antenna.

FIG. 5 is for explaining a capacitance of the shortening capacitor included in the monopole antenna illustrated in FIG. 3.

DESCRIPTION OF EMBODIMENTS

The following description will discuss one embodiment (hereinafter referred to as "the present embodiment") of the present invention with reference to the drawings. Since an antenna in accordance with the present embodiment is an antenna that includes a conductor plate having a notch, the antenna is hereinafter referred to as a "notch antenna". It should be noted, however, that the antenna in accordance with the present embodiment operates on a different principle from a conventional notch antenna disclosed in, for example, Patent Literature 2 (this is described later).

(Configuration of Antenna)

Figure 1:
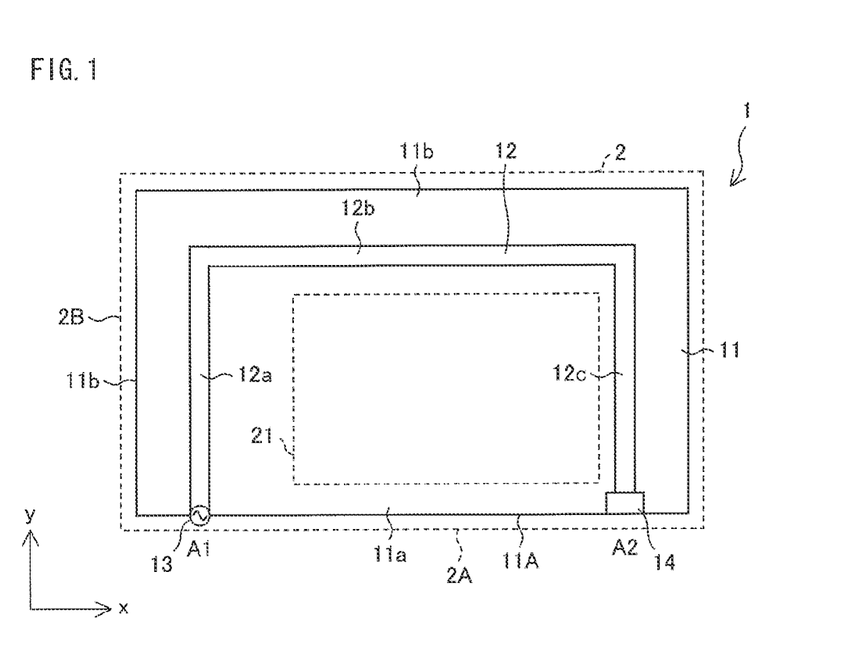
FIG. 1 is a top view illustrating a configuration of a notch antenna in accordance with one embodiment of the present invention.

The following description discusses a configuration of a notch antenna 1 in accordance with the present embodiment with reference to FIG. 1. FIG. 1 is a top view illustrating the configuration of the notch antenna 1 in accordance with the present embodiment.

As illustrated in FIG. 1, the notch antenna 1 is an antenna which includes a conductor plate 11 having a notch 12. The conductor plate 11 is a planar (plate-like) conductor. The notch 12 is a notch that has open ends and extends from one point on an edge of the conductor plate 11 to another point on the edge of the conductor plate 11. The notch 12 divides the conductor plate 11 into two regions 11a and 11b which are separated from each other.

According to the present embodiment, the conductor plate 11 is a rectangular piece of conductive foil. Furthermore, the notch 12 is a U-shaped notch that extends from a point A1 on a long side 11A of the conductor plate 11 to a point A2 on the long side 11A. The point A1 is positioned between an end (left end in FIG. 1) and middle of the long side 11A of the conductor plate 11, whereas the point A2 is positioned between an end (right end in FIG. 1) and the middle of the long side 11A of the conductor plate 11. With this configuration, the conductor plate 11 is divided into (i) the inner region 11a which is a rectangular region surrounded by the notch 12 and (ii) the outer region 11b which is a U-shaped region surrounding the notch 12. Although the notch 12 and the outer region 11b in accordance with the present embodiment each have a U shape with two corners (corners having an angle of 90 degrees in the present embodiment), this does not imply any limitation. The notch 12 and the outer region 11b may have, for example, a U shape with rounded corners.

The shape of the notch 12 can also be described as below. That is, the notch 12 is a notch constituted by (1) a first linear part 12a that extends from the point A1 (one end of the notch 12) along the positive direction of a y axis (an axis parallel to a short side 11*b* of the conductor plate 11), (2) a second linear part 12*b* that extends, from an end of the first linear part 12*a* which end is positioned more downstream along the positive direction of the y axis, along the positive direction of an x axis (an axis parallel to the long side 11A of the conductive plate 11) and (3) a third linear part 12*c* that extends, from an end of the second linear part 12*b* which end is positioned more downstream of the positive direction along the x axis, along the negative direction of the y axis to the point A2 (the other end of the notch 12).

As illustrated in FIG. 1, the inner region 11*a* and the outer region 11*b* are connected to each other in a position at or near the point A1 of the notch 12 via a high-frequency current source 13. Specifically, there is a pair of power feed points (not illustrated), which is connected to the high-frequency current source 13, in an area where the inner region 11*a* and the outer region 11*b* face each other via the point A1 of the notch 12.

Although FIG. 1 illustrates a configuration in which the high-frequency current source 13 is connected in a position at or near the point A1, where the high-frequency current source 13 (i.e., the power feed points) is connected to the inner region 11*a* and the outer region 11*b* is not limited to such. That is, the high-frequency current source 13 can be connected to anywhere between the inner region 11*a* and the outer region 11*b* which face each other via the notch 12.

Furthermore, as illustrated in FIG. 1, the inner region 11*a* and the outer region 11*b* are connected to each other in a position at or near the point A2 of the notch 12 via a capacitor 14. The capacitor 14 serves to achieve a lower resonant frequency of the notch antenna 1 without changing the total length of the notch 12 (this is described later). In other words, the capacitor 14 serves to reduce the total length of the notch 12 without changing the resonant frequency of the notch antenna 1. The capacitor 14 is hereinafter referred to as a "shortening capacitor".

Although FIG. 1 illustrates a configuration in which the shortening capacitor 14 is connected in a position at or near the point A2, where the shortening capacitor 14 is connected to the inner region 11*a* and the outer region 11*b* is not limited to such. That is, the shortening capacitor 14 can be connected anywhere between the inner region 11*a* and the outer region 11*b* which face each other via the notch 12. It should be noted however that, if the position where the shortening capacitor 14 is connected is changed, the resonant frequency of the notch antenna 1 changes. Therefore, where to connect the shortening capacitor 14 may be determined so that the notch antenna 1 resonates at a desired frequency.

The conductor plate 11, which constitutes the notch antenna 1, can be formed, for example, on a PET (polyethylene terephthalate) film, which is a planar substrate, by printing with conductive silver paste. It should be evident that such a configuration makes it possible to realize an extremely-thin notch antenna 1 that is suitable for use in a wireless tag 2. Examples of the material for the planar substrate not only include PET but also include various dielectric materials such as glass epoxy and polyimide.

In a case where the notch antenna 1 is mounted in or on the wireless tag 2, the notch antenna 1 may be placed such that the long side 11A of the conductor plate 11 runs parallel to a long side 2A (e.g., 85.6 mm) of the wireless tag 2 (see FIG. 1). In a case where a paper battery 21 is mounted in or on the wireless tag 2 together with the notch antenna 1, the paper battery 21 may be placed so as to overlap the inner region 11*a* of the conductor plate 11*a* (see FIG. 1).

With this arrangement, the paper battery 21 is well away from the notch 12. Accordingly, an electromagnetic field around the notch 12 is less weakened or distorted by the paper battery 21, and therefore a decrease in radiant intensity and nonuniformity of radiation directions, which may occur because of the paper battery 21, are suppressed. The battery mounted in or on the wireless tag 2 is not limited to the paper battery, and may be some other battery such as a button battery. Also in this case, the same effect can be achieved by placing the battery so that the battery overlaps the inner region 11*a* of the conductive plate 11.

Furthermore, the notch antenna 1 is suitable for use in the wireless tag 2 also from the following viewpoint. That is, since the wireless tag 2 is to be carried by a user, the edges of the wireless tag 2 often make contact with an external conductor such as a user's hand. In the case of a conventional wireless tag 2 including a loop antenna, a dipole antenna or a monopole antenna, it is highly likely that a radial electric field produced around an antenna element is interfered with by the external conductor that makes contact with the edges of the wireless tag 2 and thereby antenna characteristics deteriorate. On the other hand, in the case of a wireless tag 2 including the notch antenna 1, an electric field is locally produced only around the notch. Therefore, it is less likely that the external conductor which makes contact with the edges of the wireless tag 2 interferes with the electric field and thereby antenna characteristics deteriorate.

(Shape of Notch)

Figure 2:
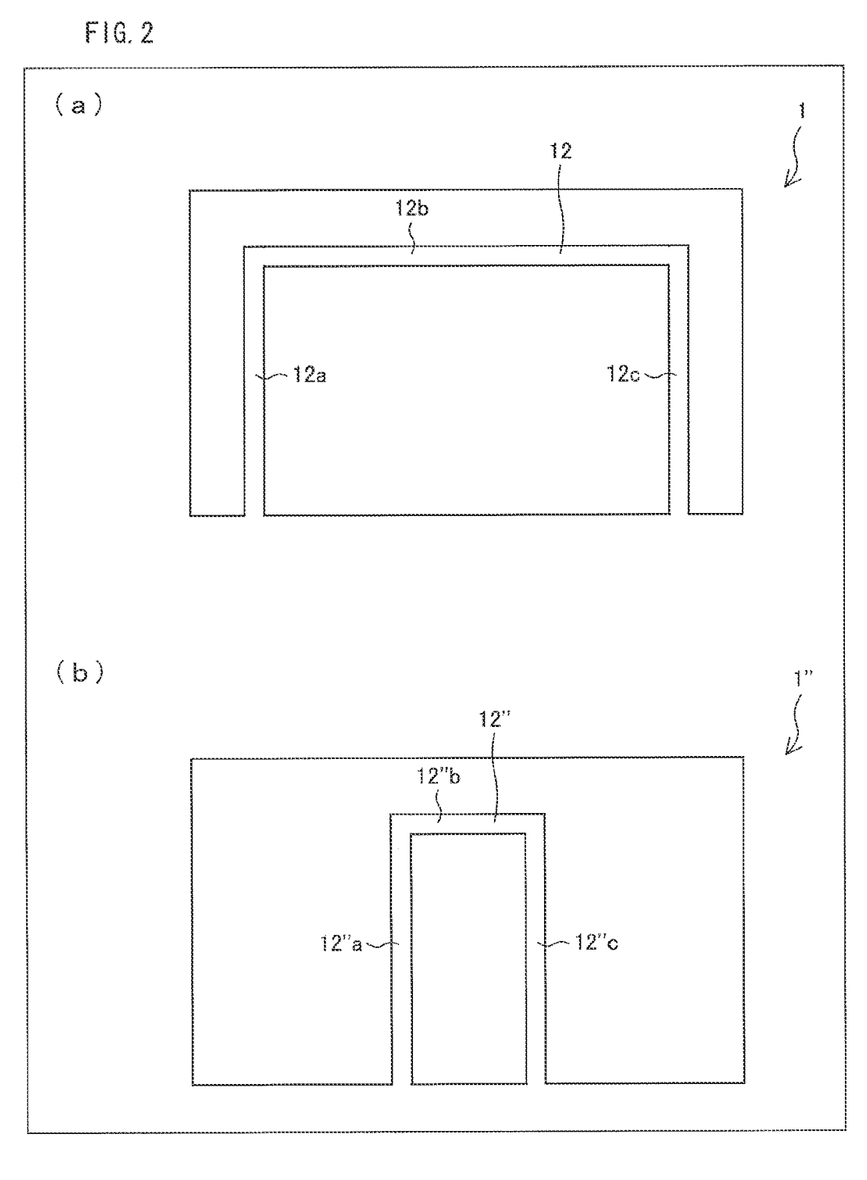

The following description discusses features of the notch 12 with reference to FIG. 2. (a) of FIG. 2 is a top view illustrating a structure of the notch 12 of the notch antenna 1 in accordance with the present embodiment. (b) of FIG. 2 is a top view illustrating a structure of a notch 12" of a notch antenna 1" (hereinafter referred to as a "conventional notch antenna") disclosed in Patent Literature 2.

As illustrated in (a) of FIG. 2, the notch 12 of the notch antenna 1 in accordance with the present embodiment is constituted by the three linear parts 12*a* to 12*c*. As illustrated in (b) of FIG. 2, the notch 12" of the conventional notch antenna 1" is constituted by three linear parts 12"*a* to 12"*c*. That is, the notch antenna 1 in accordance with the present embodiment is the same as the conventional notch antenna 1" in this point.

Notable differences between the notch antenna 1 and the notch antenna 1" are as follows. According to the conventional notch antenna 1", the length ρ"b of the second linear part 12"*b* is shorter than each of the length ρ"a of the first linear part 12"*a* and the length ρ"c of the third linear part 12"*c* (see Fig. (b) of FIG. 2). Therefore, the first linear part 12"*a* and the third linear part 12"*c*, which are parallel to each other, are very close to each other. On the other hand, according to the notch antenna 1 in accordance with the present embodiment, the length ρb of the second linear part 12*b* is longer than each of the length ρa of the first linear part 12*a* and the length ρc of the third linear part 12*c* (see (a) of FIG. 2). Therefore, there is a sufficient space between the first linear part 12*a* and the third linear part 12*c* which are parallel to each other.

The conventional notch antenna 1" is configured to operate equivalently to a notch antenna having two notches corresponding to the first linear part 12"*a* and the third linear part 12"*c* and thereby obtain a gain twice as high as that in the case where there is only one notch. Therefore, for the conventional notch antenna 1", there is a restriction that a phase difference should be π between a current passing through the first linear part 12"*a* and a current passing through the third linear part 12"*c*. Otherwise, an electromagnetic field around the first linear part 12"*a* and that around the third linear part 12"*c* interfere with each other in a way that they cancel out, and thereby radiant intensity significantly decreases. Therefore, it is necessary that the length ρ"a of the first linear part 12"a and the length ρ"c of the third linear part 12"c satisfy ρ"a=ρ"c≈λ/4 where λ is a resonant wavelength and the length ρ"b of the second linear part 12"b satisfy ρ"b≈0. Accordingly, the total length ρ"=ρ"a+ρ"b+ρ"c of the notch 12" is ρ"≈λ/2. This cannot be reduced.

On the other hand, the notch antenna 1 in accordance with the present embodiment operates equivalently to a monopole antenna that is complementary to the notch antenna 1, i.e., a monopole antenna which includes an antenna element congruent with the notch 12 (this is described later). Therefore, it is possible to cause the total length ρ=ρa+ρb+ρc of the notch 12 to satisfy ρ≤λ/4 where λ is a resonant wavelength. It should be noted here that the reason why the total length ρ is not ρ=λ/4 but ρ≤λ/4 is that the notch antenna 1 in accordance with the present embodiment includes the shortening capacitor 14.

As described above, the notch antenna 1 in accordance with the present embodiment operates on the different principle from the conventional notch antenna 1". This allows the notch antenna 1, which has the notch 12 whose total length is smaller than that of the conventional notch antenna 1", to have the same resonant wavelength as that of the conventional notch antenna 1".

It should be noted that, although the notch antenna in accordance with the present embodiment is not designed to double the gain like the conventional notch antenna 1", this does not cause difficulty in application of the notch antenna 1 to a wireless tag. The reason is that, even with the notch antenna 1 in accordance with the present embodiment, it is possible to obtain a gain in which the electric field strength at a distance of 3 meters is as high as 500 μV/m (the maximum strength allowed for use without a license) and therefore it is not necessary to double the gain.

(Effects of Shortening Capacitor)

Figure 3:
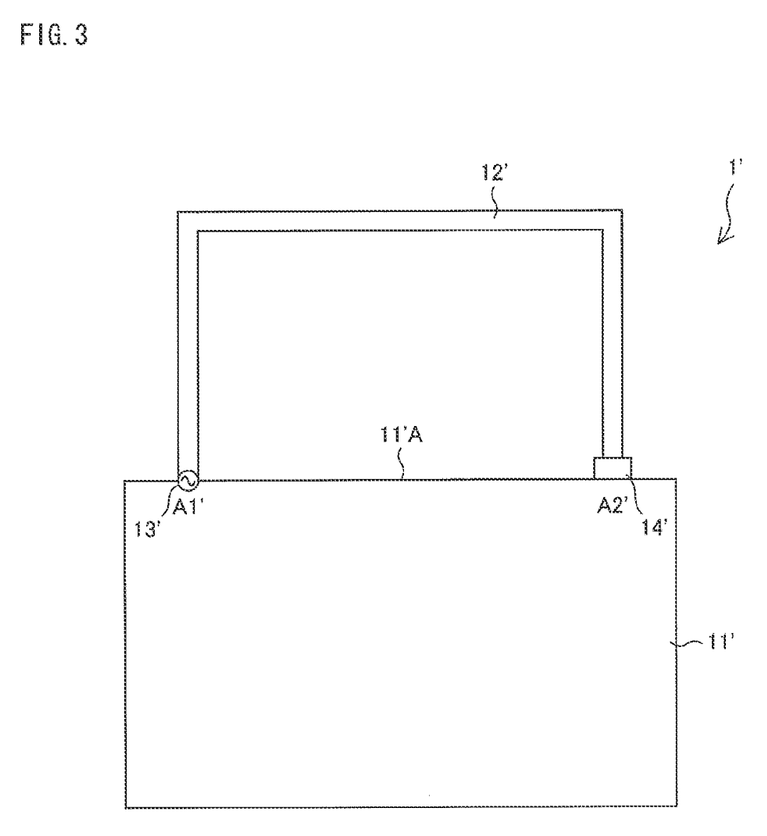
FIG. 3 is a top view illustrating a configuration of a monopole antenna that is complementary to the notch antenna illustrated in FIG. 1.

First, the following description discusses a monopole antenna 1' that is complementary to the notch antenna 1 with reference to FIG. 3. FIG. 3 is a top view illustrating a configuration of the monopole antenna 1' that is complementary to the notch antenna 1.

The monopole antenna 1' is a monopole antenna which includes a ground plate 11' and a U-shaped bent antenna element 12'. As illustrated in FIG. 3, the ground plate 11' is a planar (plate-like) conductor, and the antenna element 12' is a ribbon-shaped conductor that is congruent with the notch 12 of the notch antenna 1.

One end of the antenna element 12' is connected to a point A1' on a side 11'A of the ground plate 11' via a high-frequency current source 13'. On the other hand, the other end of the antenna element 12' is connected to a point A2' on the side 11'A of the ground plate 11' via a shortening capacitor 14'.

The notch antenna 1 (FIG. 1) is complementary to the monopole antenna 1' (FIG. 3). Accordingly, the shortening capacitor 14 in FIG. 1 brings about the same effects as the shortening capacitor 14' of the monopole antenna 1' (FIG. 3).

Figure 4:
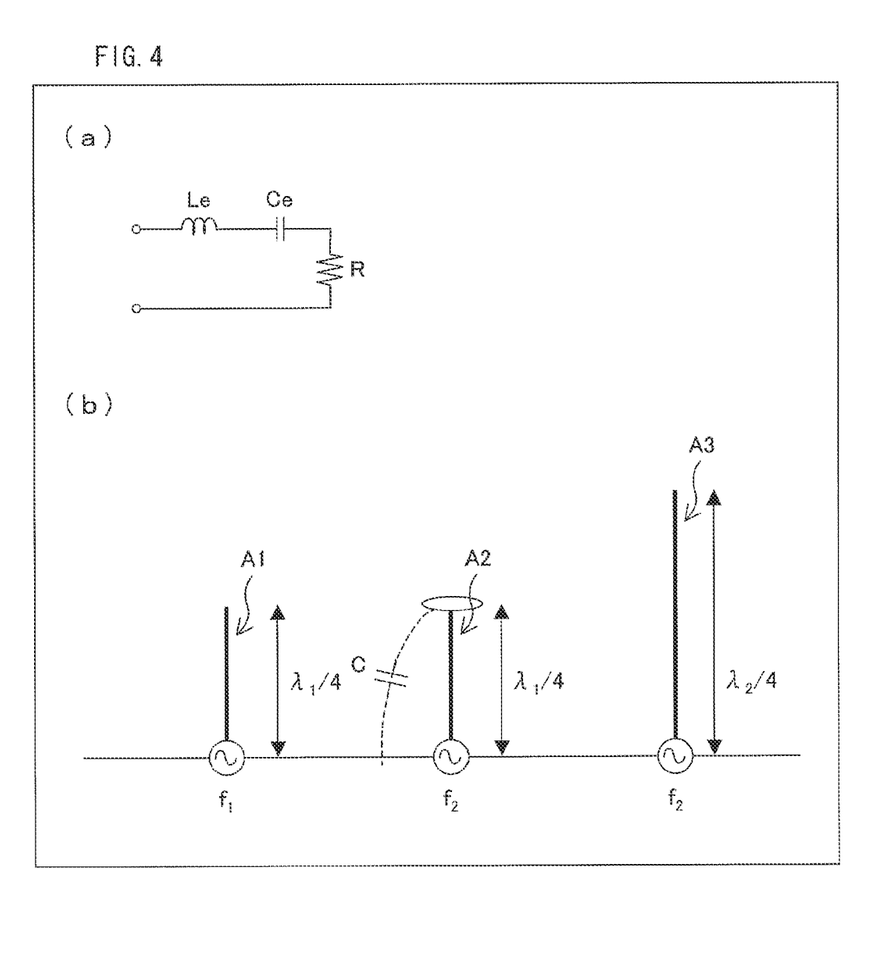
FIG. 4 is for explaining the effects of a shortening capacitor included in the monopole antenna illustrated in FIG. 3. (a) of FIG. 4 is an equivalent circuit of the antenna. (b) of FIG. 4 illustrates a monopole antenna A1, an antenna A2 obtained by adding the shortening capacitor to the monopole antenna A1, and a monopole antenna A3 having the same resonant frequency as the antenna A2.

Next, the following description discusses the effects of the shortening capacitor 14' of the monopole antenna 1' (FIG. 3) with reference to FIG. 4. It is needless to say that the shortening capacitor 14 of the notch antenna 1 (FIG. 1), which is complementary to the monopole antenna 1', brings about the same effects as described below.

As has been well-known, a monopole antenna is equivalent to a series RLC resonant circuit illustrated in (a) of FIG. 4. In (a) of FIG. 4, R is radiation resistance, $L_e$ is effective inductance, and $C_e$ is effective capacitance. The effective inductance $L_e$ and the effective capacitance $C_e$ depend on the material and shape etc. of the antenna element. Impedance Z is given by Equation (1), and resonant frequency $f_o$ is given by Equation (2):

[Math 1]

$$Z = R + j\left(\omega L_e - \frac{1}{\omega C_e}\right)[\Omega] \quad (1)$$

[Math 2]

$$f_o = \frac{1}{2\pi\sqrt{L_e C_e}}[Hz] \quad (2)$$

For understanding of the effects of the shortening capacitor 14, three antennas A1 to A3 illustrated in (b) of FIG. 4 are considered.

The antenna A1 is a monopole antenna having an effective inductance $L_1$ and an effective capacitance $C_1$. The resonant frequency $f_1$ of the antenna A1 is given by Equation (3). The total length $\rho_1$ of an antenna element of the antenna A1 is $\rho_1 = \lambda_1/4$ where $\lambda_1 = c/f_1$ (c is the speed of light).

[Math 3]

$$f_1 = \frac{1}{2\pi\sqrt{L_1 C_1}} \quad (3)$$

The antenna A2 is different from the antenna A1 in that a shortening capacitor, which has a capacitance C, is added between a ground plate and an end part of the antenna element which end part is opposite to the power feed-side end part. The addition of the shortening capacitor is realized by providing a disc at the end part of the antenna element which end part is opposite to the power feed-side end part such that the disc and the ground plate have a stray capacitance C between them. Since the effective inductance $L_2$ of the antenna A2 is $L_2=L_1$ and the effective capacitance $C_2$ of the antenna A2 is $C_2=C_1+C$, the resonant frequency $f_2$ of the antenna A2 is given by Equation (4). The total length $\rho_2$ of the antenna element of the antenna A2 is $\rho_2=\lambda_1/4$, which is the same as the antenna A1.

[Math 4]

$$f_2 = \frac{1}{2\pi\sqrt{L_1(C_1 + C)}} < f_1 \quad (4)$$

The antenna A3 is a monopole antenna having the resonant frequency $f_2$ which is the same as the antenna A2. The total length $\rho_3$ of an antenna element of the antenna A3 is $\rho_3=\lambda_2/4$ where $\lambda_2=c/f_2$. Since $f_2<f_1$ as shown in Equation (4), the total length, $\rho_3=c/(4f_2)$, of the antenna element of the antenna A3 is larger than the total length, $\rho_1=c/(4f_1)$, of the antenna element of the antenna A1.

The comparison between the antenna A2 and the antenna A3 shows that, by adding the shortening capacitor, it is possible to reduce the total length of the antenna element without changing the resonant frequency. In other words, the comparison shows that the shortening capacitor makes it possible to realize a monopole antenna that (i) has a resonant wavelength of λ and (ii) includes an antenna element whose total length is smaller than λ/4. Furthermore, the comparison between the antenna A2 and the antenna A1 shows that, by adding the shortening capacitor, it is possible to cause the resonant frequency to shift lower without changing the total length of the antenna element. In other words, the comparison shows that the shortening capacitor makes it possible to realize a monopole antenna that (i) includes an antenna element whose total length is ρ and (ii) has a resonant wavelength of longer than 4ρ.

The same is true with notch antennas that are complementary to these antennas. That is, by adding the shortening capacitor, it is possible to reduce the total length of the notch without changing the resonant frequency. In other words, the shortening capacitor makes it possible to realize a notch antenna that (i) has a resonant frequency of λ and (ii) has a notch whose total length is smaller than λ/4. Furthermore, by adding the shortening capacitor, it is possible to cause the resonant frequency to shift lower without changing the total length of the notch. In other words, the shortening capacitor makes it possible to realize a notch antenna that (i) has a notch whose total length is ρ and (ii) has a resonant wavelength of longer than 4ρ.

Figure 5:
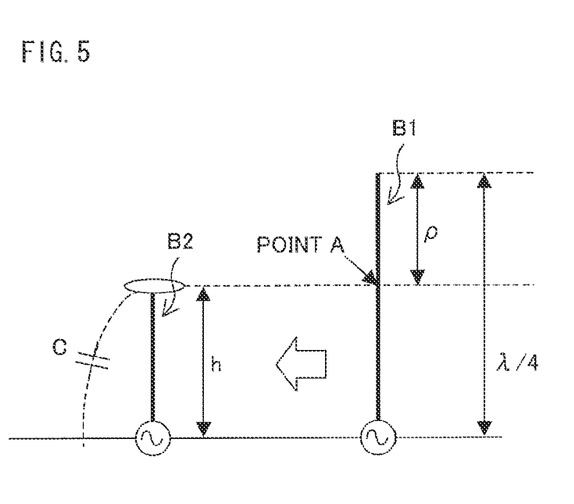
FIG. 5 illustrates (i) a monopole antenna B1 including an antenna element whose total length is $\lambda/4$ and (ii) a monopole antenna B2 which includes an antenna element whose total length is h and to which the shortening capacitor having a capacitance C has been added.

Next, the following description discusses, with reference to FIG. 5, how to determine the capacitance of the shortening capacitor 14' of the monopole antenna 1' (FIG. 3). It is needless to say that the capacitance of the shortening capacitor 14 of the notch antenna 1 (FIG. 1), which is complementary to the monopole antenna 1', can be determined in the same way as described below.

Consider that the total length of an antenna element of a monopole antenna is reduced from λ/4 [m] to h [m] (see FIG. 5). In FIG. 5, an antenna B1 is a monopole antenna having an antenna element whose total length is not shortened and is λ/4, whereas an antenna B2 is a monopole antenna having an antenna element whose total length has been shortened to h. Assuming that the antenna element is a straight wire that is perpendicular to a ground surface (infinite ground plate) and has a circular cross section d [m] in diameter, the capacitance C (F) of the shortening capacitor to be added is given by Equation (5):

[Math 5]

$$C = \frac{1}{120\pi f \left\{\ln\left(\frac{4h}{d}\right) - 1\right\}} \tan\left\{\frac{2\pi}{\lambda}\left(\frac{\lambda}{4} - h\right)\right\} [F] \quad (5)$$

where λ [m] is operating wavelength (resonant wavelength), and f [Hz] is operating frequency (resonant frequency). The wavelength λ and the frequency f are in the following relationship: f=c/λ where c [m/sec] is the speed of light. Equation (5) is obtained in the following manner.

As described earlier, an antenna is equivalent to the series RLC resonant circuit illustrated in (a) of FIG. 4. Assuming that a point at a distance of ρ=λ/4−h from the top of the antenna is point A, the input impedance Z [Ω] of a part extending from point A to the top of the antenna is given by Equation (6) in accordance with a theoretical formula of a high-frequency transmission path with an open end:

[Math 6]

$$Z = -jZ_0 \cot \beta \rho [\Omega] \quad (6)$$

where $Z_0$ is characteristic impedance [Ω] of the transmission path, and β is the number of waves 2π/λ [1/m]. It is known that the characteristic impedance $Z_0$ of a straight wire that is perpendicular to a ground surface and has a circular cross section d [m] in diameter is approximated with Equation (7):

[Math 7]

$$Z_0 = 60\left\{\ln\left(\frac{4h}{d}\right) - 1\right\} [\Omega] \quad (7)$$

On the other hand, the impedance Z [Ω] of a capacitor having a capacitance C [F] is, as has been well-known, given by Equation (8) with angular frequency ω [rad/sec]:

[Math 8]

$$Z = -j\frac{1}{\omega C}[\Omega] \quad (8)$$

In order to reduce the total length of the antenna element from λ/4 to h, it is only necessary to match the impedance Z of the shortening capacitor to be added to the input impedance Z shown in Equation (6). That is, the capacitance C of the shortening capacitor to be added is, assuming that the right side of Equation (8) is equal to the right side of Equation (6) into which Equation (7) is substituted, calculated by the following equations:

[Math 9]

$$-j\frac{1}{\omega C} = -jZ_0 \cot \beta \rho \quad (9)$$

$$C = \frac{1}{\omega Z_0} \cot \beta \rho = \frac{1}{120\pi f\left\{\ln\left(\frac{4h}{d}\right) - 1\right\}} \tan\left\{\frac{2\pi}{\lambda}\left(\frac{\lambda}{4} - h\right)\right\} [F]$$

It should be noted that Equation (5) gives the capacitance C of the shortening capacitor to be added in a case where the antenna element is a straight wire that is perpendicular to a ground surface and has a circular cross section d [m] in diameter. However, even in a case where a bent antenna element 12' is provided on a plane where the ground plate 11' is provided like the monopole antenna 1' (FIG. 3), Equation (5) is sufficient to estimate the capacitance of the shortening capacitor 14' to be added.

For example, the capacitance of the shortening capacitor 14' can be set at Co±50% (i.e., not less than 0.5×Co but not greater than 1.5×Co) where Co is a capacitance C obtained by substituting d=W into Equation (5), assuming that the mean width of the antenna element 12' is W [m]. Provided that the capacitance of the shortening capacitor 14' falls within this range, it is almost always possible to reduce the total length of the antenna element 12' from λ/4 [m] to h [m]. The reason why the Co has a margin of ±50% is that the effective capacitance of the antenna 1' may deviate from a value of theoretical calculation depending on the material, shape (whether the antenna element 12' is bent or not or how it is bent), and thickness of the antenna element 12'.

The capacitance of the shortening capacitor 14 of the notch antenna 1 (FIG. 1) can also be determined in the same manner. That is, the capacitance C of the shortening capacitor 14 can be set, for example, at Co±50% (i.e., not less than 0.5×Co but not greater than 1.5×Co) where Co [F] is a capacitance C obtained by substituting d=W into Equation (5) assuming that the mean width of the notch 12 is W [m]. When the capacitance of the shortening capacitor 14 falls within this range, it is almost always possible to reduce the total length of the notch 12 from $\lambda/4$ [m] to h [m].

Although the notch antenna 1 in accordance with the present embodiment has the notch 12 having a U shape constituted by the three linear parts 12a to 12c as described earlier, the shape of the notch 12 is not limited to such. That is, for example, at least part of the notch 12 may have a meander shape. In a case where the notch 12 has a meander shape, the total length ρ of such a notch 12 can be increased without increasing the size of the notch antenna 1. Conversely, it is possible to reduce the size of the notch antenna 1 without reducing the total length ρ of the notch 12. That is, it is possible to reduce the size of the notch antenna 1 without shortening the resonant wavelength (without raising the resonant frequency) of the antenna 1. It should be noted however that, in a case where the notch 12 has a meander shape, electromagnetic fields around the notch 12's components that are close to each other may interfere with each other so as to cancel out, and this may result in a reduction in antenna gain. With the notch 12 having a U shape constituted by the three linear parts 12a to 12c, it is possible to avoid such a reduction in antenna gain.

Furthermore, although the notch antenna 1 in accordance with the present embodiment employs a configuration in which a capacitance for shortening the notch 12 is realized by adding the shortening capacitor 14 between the inner region 11a and the outer region 11b of the conductor plate 11, how to realize the capacitance for shortening the notch 12 is not limited to such. That is, for example, the capacitance for shortening the notch 12 can be realized by a gap between the inner region 11a and the outer region 11b of the conductor plate 11. Such a configuration may be achieved by, for example, causing a part of the inner region 11a and a part of the outer region 11b of the conductor plate 11 to protrude toward each other to thereby partly narrow the notch 12 so that the capacitance between the inner region 11a and the outer region 11b of the conductor plate 11 becomes larger.

Examples

Figure 6:
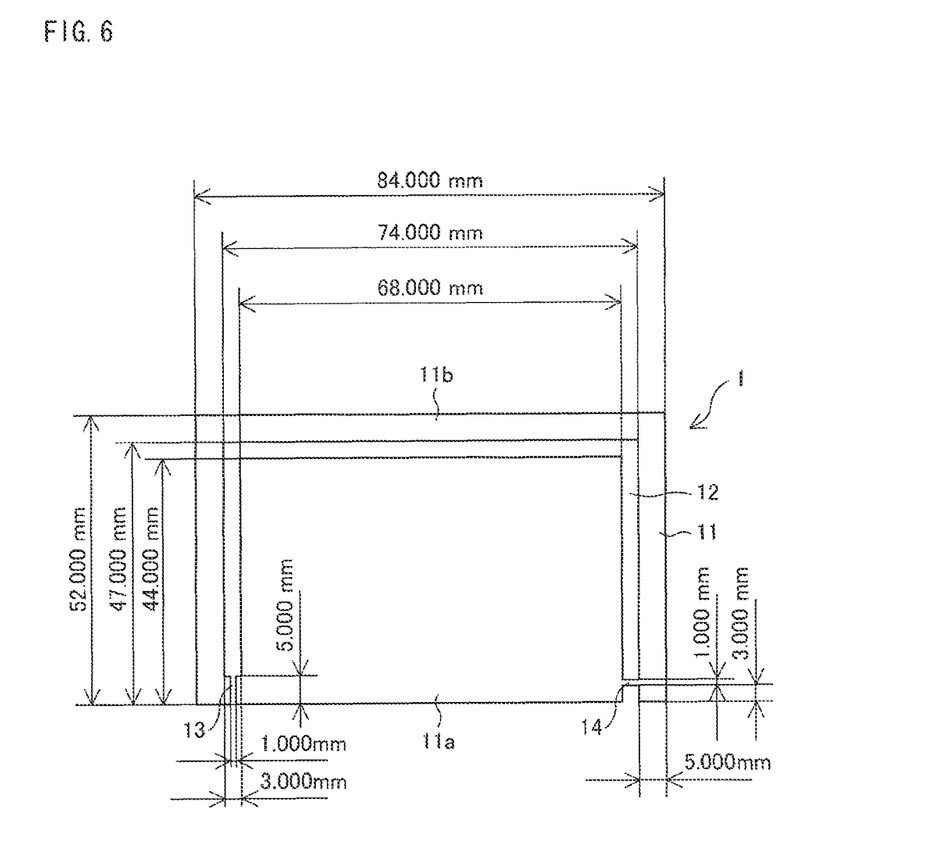
FIG. 6 is a top view illustrating one example of the notch antenna illustrated in FIG. 1.
Figure 7:
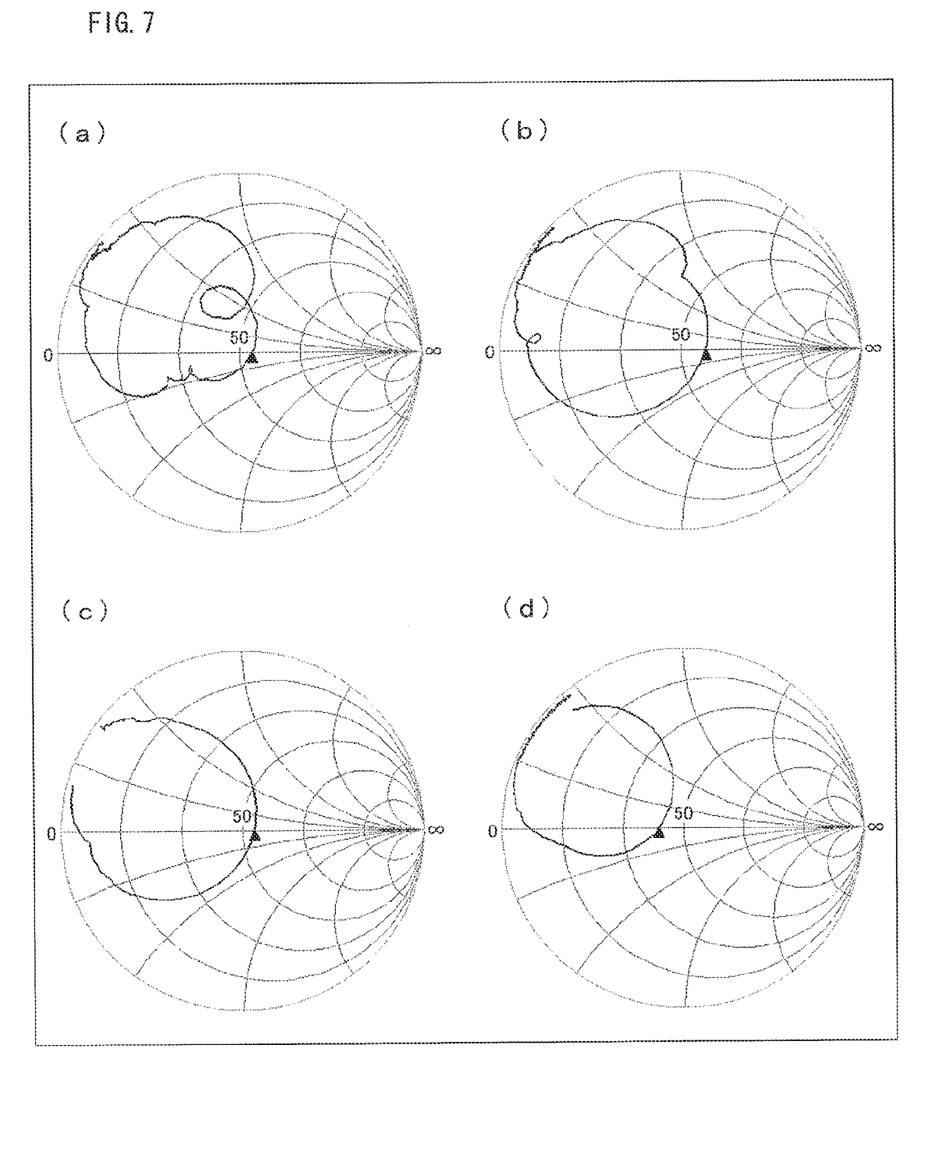
FIG. 7 shows Smith charts obtained by plotting S-parameters (S11) of the notch antenna illustrated in FIG. 5. (a) of FIG. 7 is a Smith chart when no shortening capacitor is added. (b) of FIG. 7 is a Smith chart when a 0.5-pF shortening capacitor is added. (c) of FIG. 7 is Smith chart when a 1-pF shortening capacitor is added. (d) of FIG. 7 is a Smith chart when a 3-pF shortening capacitor is added.

Lastly, with reference to FIGS. 6 and 7, the following description shows that it is possible to cause a notch antenna 1, which is capable of being mounted in or on a wireless tag 2 having a size of an ID-1 card (85.6 mm×54.0 mm), to operate in the 315 MHz band by adding a shortening capacitor 14 having an appropriate capacitance.

FIG. 6 is a top view illustrating a specific shape of the notch antenna 1 in accordance with the present example. The dimensions of the conductor plate 11 and the notch 12 are as shown in FIG. 6. As illustrated in FIG. 6, the notch antenna 1 is arranged such that the conductor plate 11 having the notch 12 is provided within a rectangular region of 85.6 mm×54.0 mm, more specifically, within a rectangular region of 84.0 mm×52.0 mm, so that the notch antenna 1 is capable of being mounted in or on the wireless tag 2 having the size of an ID-1 card.

When the notch antenna 1 is mounted in or on the wireless tag 2, such a wireless tag 2 has a cross section made up of a package (back), the paper battery 21, a membrane substrate including the notch antenna 1, and the package (front) which are stacked in this order. The thickness of the package is 0.1 mm, the thickness of the paper battery 21 is 0.5 mm, and the thickness of the membrane substrate is 0.1 mm. Therefore, the minimum thickness of the wireless tag 2 as a whole is 0.8 mm. Therefore, it is possible to realize a card-shaped active tag having a thickness of as small as that of a passive tag (which typically has a thickness of approximately 1 mm) such as an e-cash card.

The capacitance C of the shortening capacitor 14, which is to cause the antenna 1 having the shape illustrated in FIG. 6 to resonate at 315 MHz, can be calculated in accordance with the foregoing Equation (5). Specifically, substitution of f=315 MHz, wavelength $\lambda$=0.952 m, h=0.164 m, and d=0.003 m into Equation (5) yields Co=1.02 pF. This shows that it is only necessary that the capacitance C of the shortening capacitor 14 be approximately 1.02 pF (±50%).

This is demonstrated by the experimental results shown in FIG. 7. FIG. 7 shows Smith charts for the results obtained by measuring S parameters (S11) of the notch antenna 1 in accordance with the present example at 250 MHz to 500 MHz. (a) of FIG. 7 is a Smith chart when no shortening capacitor 14 is provided. (b) of FIG. 7 is a Smith chart when the capacitance C of the shortening capacitor 14 is 0.5 pF. (c) of FIG. 7 is a Smith chart when the capacitance C of the shortening capacitor 14 is 1 pF. (d) of FIG. 7 is a Smith chart when the capacitance C of the shortening capacitor 14 is 3 pF. In these Smith charts, an intersection of S parameter and the real axis represents a resonant frequency. The labels "0", "50" and "∞" on the real axis represent "0Ω", "50Ω" and "∞Ω", respectively.

In a case where no shortening capacitor 14 is provided, the notch antenna 1 does not have any resonant frequency in the range of 250 MHz to 500 MHz (see (a) of FIG. 7). On the other hand, in a case where the capacitance of the shortening capacitor 14 is 0.5 pF, the notch antenna 1 resonates at a frequency (338.8 MHz) higher than 315 MHz (see (b) of FIG. 7). In a case where the capacitance of the shortening capacitor 14 is 1 pF, the notch antenna 1 resonates at 315 MHz (see (c) of FIG. 7). In a case where the capacitance of the shortening capacitor 14 is 3 pF, the notch antenna 1 resonates at a frequency lower than 315 MHz (see (d) of FIG. 7). That is, the results show that, with the use of the shortening capacitor 14 having a capacitance of 1 pF, it is possible to cause the notch antenna 1 in accordance with the present example to operate at 315 MHz.

In a case where the resonant frequency f is 315 MHz, a corresponding wavelength $\lambda$=c/f (c is the speed of light) is 95.2 cm. Therefore, assuming that no shortening capacitor 14 is provided, the total length of the notch 12 should be $\lambda/4$=24 cm. On the other hand, when the shortening capacitor 14 having a capacitance of 1 pF is added, the total length of the notch 12 can be reduced to approximately 16 cm (see FIG. 6). As such, by adding the shortening capacitor 14 having a capacitance of 1 pF, it is possible to realize a notch antenna 1 which has a resonant frequency of 315 MHz and is capable of being mounted in or on the wireless tag 2 having the size of an ID-1 card (85.6 mm×54.0 mm).

It should be noted that, although the present example is based on the assumption that the paper battery 21 and the inner region 11a of the conductor plate 11 overlap each other, this does not imply any limitation. For example, it is possible to employ a configuration in which (i) the inner region 11a of 68 mm×44 mm has a cutout of 49 mm×40 mm and (ii) the paper batter 21 of, for example, 48 mm×38 mm is fitted in the cutout (the inner region 11a here has a U shape, and a gap of 1 mm is formed between an edge of the inner region 11a and an edge of the paper battery 21). In this case, the area of the conductor plate 11 is smaller than that in the case of the configuration illustrated in FIG. 6. Therefore, it is possible to significantly reduce material costs for the notch antenna 1 (costs for conductive foil which is a main material for the notch antenna 1). Furthermore, since the conductor plate 11 and the paper battery 21 do not have to be stacked together like the configuration illustrated in FIG. 6, it is possible to reduce the thickness of the wireless tag 2 to equal to or less than 0.76 mm, which is a value specified in ISO/IEC7810. In fact, assuming that the thickness of the package is 0.1 mm, the thickness of the paper battery 21 is 0.5 mm and the thickness of the membrane substrate is 0.1 mm, the minimum thickness of the wireless tag 2 as a whole is 0.7 mm.

[Supplementary Matter]

Although the present embodiment employs a configuration in which the two regions 11a and 11b constituting the conductor plate 11 are provided on an identical plane, the present invention is not limited to such. For example, the following configuration is also encompassed in the present invention: the first region 11a is provided on a first plane; and at least part of the second region is provided on a second plane that is parallel to the first plane. The following description discusses, with reference to FIGS. 8 and 9, two modified examples of the notch antenna 1 having such a configuration.

Figure 8:
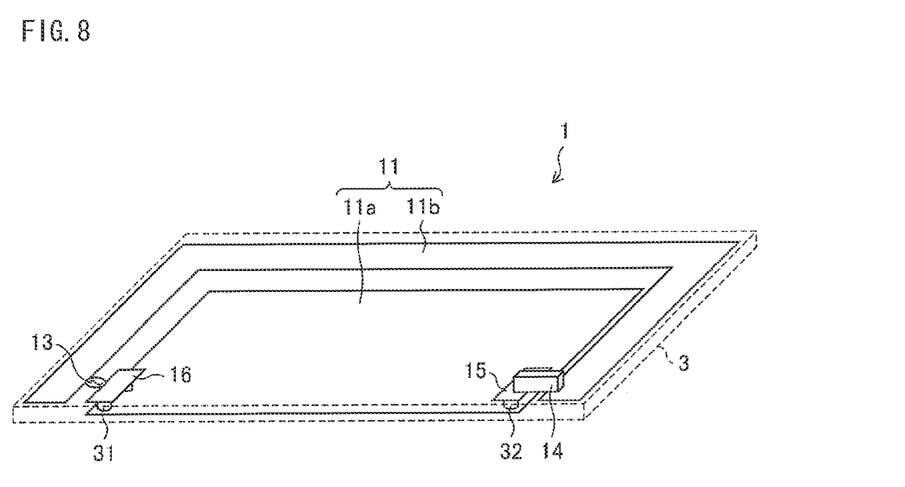
FIG. 8 is a perspective view illustrating a first modified example of the notch antenna illustrated in FIG. 1.

FIG. 8 is a perspective view illustrating a first modified example of the notch antenna 1. According to the modified example illustrated in FIG. 8, the notch antenna 1 is mounted on a planar substrate 3. Examples of the material for the planar substrate 3 not only include PET but also include various dielectric materials such as glass epoxy and polyimide. Because the notch antenna 1 is for use in a wireless tag 2 having the size of an ID-1 card (85.6 mm×54.0 mm), it is preferable that the size of each of the front and back surfaces of the substrate 3 is not more than 85.6 mm×54.0 mm and that the thickness of the substrate 3 is not more than 5.0 mm.

In particular, according to this specific example, the first region 11a of the conductor plate 11 is provided on the back surface of the substrate 3, whereas the entire second region 11b of the conductor plate 11 is provided on the front surface of the substrate 3. On the front surface of the substrate 3, not only the second region 11b of the conductor plate 11 but also lands 15 and 16 are provided which are electrically connected to the first region 11a of the conductor plate 11.

The land 15 is provided near one end of the second region 11b, and is connected to the first region 11a via a conductive material which fills a through hole 32. The shortening capacitor 14 is provided on the front surface of the substrate 3 so as to bridge the one end of the second region 11b and the land 15.

The land 16 is provided near the other end of the second region 11b, and is connected to the first region 11a via a conductive material which fills a through hole 31. The high-frequency current source 13 is connected to a power feed point at the other end of the second region 11b and to a power feed point in the land 16.

Figure 9:
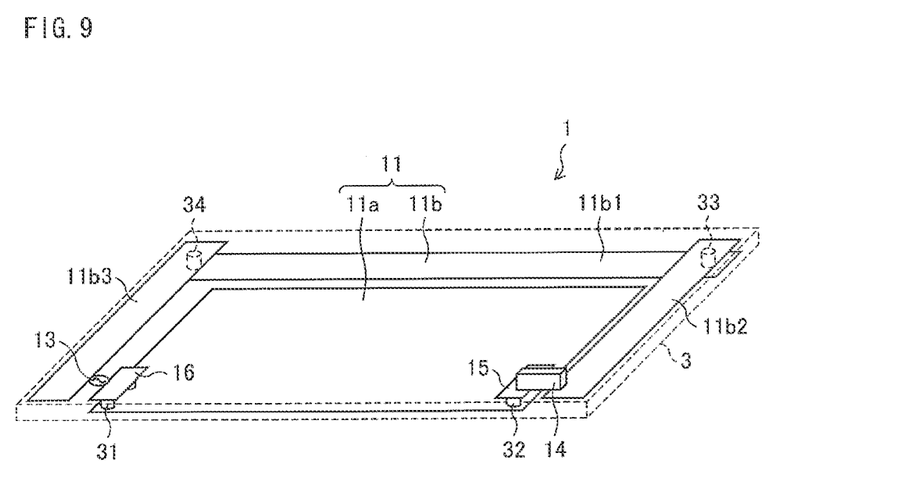
FIG. 9 is a perspective view illustrating a second modified example of the notch antenna illustrated in FIG. 1.

FIG. 9 is a perspective view illustrating a second modified example of the notch antenna 1. Also according to the modified example illustrated in FIG. 9, the notch antenna 1 is mounted on the planar substrate 3. Because the notch antenna 1 is for use in a wireless tag 2 having the size of an ID-1 card (85.6 mm×54.0 mm), it is preferable that the size of each of the front and back surfaces of the substrate 3 is not more than 85.6 mm×54.0 mm and that the thickness of the substrate 3 is not more than 5.0 mm.

In particular, according to this specific example, the first region 11a and a certain part (specifically, a linear part 11b1) of the second region 11b of the conductor plate 11 are provided on the back surface of the substrate 3, whereas the other parts (specifically, a linear part 11b2 and a linear part 11b3) of the second region 11b of the conductor plate 11 are provided on the front surface of the substrate 3. On the front surface of the substrate 3, lands 15 and 16 are further provided which are electrically connected to the first region 11a of the conductor plate 11.

The linear part 11b2 of the second region 11b on the front surface of the substrate 3 is connected, via a conductive material which fills a through hole 33, to the linear part 11b1 of the second region 11b on the back surface of the substrate 3. Similarly, the linear part 11b3 of the second region 11b on the front surface of the substrate 3 is connected, via a conductive material which fills a through hole 34, to the linear part 11b1 of the second region 11b on the back surface of the substrate 3. With this configuration, the second region 11b, which is constituted by the three linear parts 11b1 to 11b3, electrically serves as a single conductor plate.

The land 15 is provided near the linear part 11b2 of the second region 11b, and is connected to the first region 11a via a conductive material which fills a through hole 32. The shortening capacitor 14 is provided on the front surface of the substrate 3 so as to bridge the linear part 11b2 of the second region 11b and the land 15.

The land 16 is provided near the linear part 11b3 of the second region 11b, and is connected to the first region 11a via a conductive material which fills a through hole 31. The high-frequency current source 13 is connected to a power feed point in the linear part 11b3 of the second region 11b and to a power feed point in the land 16.

In both of the modified examples illustrated in FIGS. 8 and 9, provided that the distance between the first plane where the first region 11a is provided and the second plane where the second region is provided is small enough, i.e., provided that the thickness of the substrate 3 is small enough, it is possible to obtain antenna characteristics equivalent to those of the notch antenna illustrated in FIG. 1. For example, provided that the distance between the first plane and the second plane is equal to or less than 5% the total length of the notch 12, effects of the first region 11a and the second region 11b provided on the different planes on the antenna characteristics are negligible. Accordingly, it is possible to obtain antenna characteristics equivalent to those of the notch antenna 1 illustrated in FIG. 1.

Furthermore, in both of the modified examples illustrated in FIGS. 8 and 9, circuits (e.g., an oscillation circuit and a detector circuit) that constitute the high-frequency current source 13 and a power feed line that connects the high-frequency current source 13 and the conductor plate 11 etc. can be provided on the front surface of the substrate 3 together with the shortening capacitor 14. That is, when producing an antenna substrate including the notch antenna 1, it is not necessary to employ a double-sided mounting that is more expensive than a single-sided mounting. Therefore, it is possible to reduce production costs for the antenna substrate. Furthermore, since current paths are simplified, the operation of the antenna substrate is expected to be stable. Needless to say, it is also possible to realize a thinner antenna substrate and a thinner wireless tag 2 including the antenna substrate.

In a case where the substrate 3 is a multilayer substrate, instead of the configuration in which both the first region 11a and the second region 11b are provided on an outer layer(s) (the front surface and/or the back surface) of the substrate 3, the following configuration may be employed: the first region 11a and/or the second region 11b is/are provided on an inner layer(s) of the substrate 3. Specifically, the following configuration may be employed: the first region 11a is provided on a first layer that is an outer or inner layer of the substrate 3, and a whole or part of the second region 11b is provided on a second layer that is an outer or inner layer of the substrate 3 other than the first layer.

[Closing]

As has been described, an antenna in accordance with the present embodiment includes: a conductor plate having a notch, the conductor plate being divided into a first region and a second region by the notch; and a capacitor that bridges the first region and the second region.

According to the configuration, the effects of the capacitor make it possible to reduce, to less than $\lambda/4$, the total length of the notch of the antenna which has a resonant wavelength of $\lambda$. In other words, the capacitor makes it possible to increase, to greater than $4\rho$, the resonant wavelength of the antenna which has a notch whose total length is $\rho$.

The antenna in accordance with the present embodiment is preferably configured such that: the conductor plate is provided within a rectangular region of equal to or smaller than 85.6 mm×54.0 mm; and the antenna operates at a frequency equal to or lower than 322 MHz.

According to the configuration, it is possible to realize a wireless tag (e.g., a wireless tag having the size of an ID-1 card specified in ISO/IEC7810) which is easily portable and is easily compatible with other IC cards. Furthermore, since the antenna operates at a frequency equal to or lower than 322 MHz, it is possible to realize a wireless tag that achieves a strong-enough electric field strength and is easily accessible to everyone.

The antenna in accordance with the present embodiment is preferably configured such that: the notch is a ribbon-shaped notch; and a capacitance of the capacitor is set so as to be not less than 0.5×Co but not greater than 1.5×Co where Co [F] is C obtained by substituting d=W into the following Equation (A):

[Math 10]

$$C = \frac{1}{120\pi f\left\{\ln\left(\frac{4h}{d}\right) - 1\right\}} \tan\left\{\frac{2\pi}{\lambda}\left(\frac{\lambda}{4} - h\right)\right\} [F] \quad (A)$$

wherein f [Hz] is a/the resonant frequency of the antenna, $\lambda$ [m] is a resonant wavelength of the antenna found from $\lambda$=c/f where c is the speed of light, h [m] is a total length of the notch, and W [m] is a mean width of the notch.

According to the configuration, the effects of the capacitor make it possible to reduce, to $h<\lambda/4$, the total length of the notch of the antenna which has a resonant wavelength of $\lambda$.

The antenna in accordance with the present embodiment is preferably configured such that: the notch is a U-shaped notch; and the conductor plate is divided, by the notch, into (i) the first region which is a rectangular region surrounded by the notch and (ii) the second region which is a U-shaped region surrounding the notch.

According to the configuration, the following is achieved: when the antenna is mounted in or on a wireless tag etc., by placing a conductor part such as a battery so that the conductor part overlaps the first region, it is possible to reduce the likelihood that the conductive part weakens or distorts an electromagnetic field around the notch. Accordingly, it is possible to suppress a deterioration of antenna characteristics that may be caused by the conductor part.

The antenna in accordance with the present embodiment is preferably configured such that the U-shaped notch includes three linear parts made up of two parallel linear parts and the other one linear part, the other one linear part being longer than each of the two parallel linear parts.

According to the configuration, it is possible to cause the antenna to operate such that the total length of the notch is less than $\lambda/4$ where $\lambda$ is a resonant wavelength of the antenna.

The antenna in accordance with the present embodiment is preferably configured such that at least part of the notch has a meander shape.

According to the configuration, it is possible to increase the total length the notch without increasing the size of the antenna. Conversely, it is possible to reduce the size of the antenna without reducing the total length of the notch. That is, it is possible to reduce the size of the antenna without shortening the resonant wavelength (without raising the resonant frequency) of the antenna.

It should be noted that the antenna in accordance with the present embodiment is configured such that the total length of the notch is reduced to less than $\lambda/4$ by a capacitance between the first region and the second region. The capacitance may either be given by a capacitor provided between the first region and the second region or be a capacitance of a gap between the first region and the second region. That is, antennas each including a conductive plate divided into a first region and a second region by a notch, whose total length is less than $\lambda/4$, are all encompassed in the present invention regardless of whether they include a capacitor or not.

It should be noted that a wireless tag containing the antenna in accordance with the present embodiment is also encompassed in the present invention.

[Additional Remark]

The present invention is not limited to the descriptions of the respective embodiments, but may be altered within the scope of the claims. An embodiment derived from a proper combination of technical means altered as appropriate within the scope of the claims is also encompassed in the technical scope of the invention.

INDUSTRIAL APPLICABILITY

An antenna in accordance with the present invention is suitably usable as an antenna to be mounted in or on a wireless tag. The antenna is also suitably usable as an antenna to be mounted in or on a Zigbee (registered trademark) module which is compliant with IEEE802.15.4.

REFERENCE SIGNS LIST 1 notch antenna (antenna)
11 conductive plate
11a inner region (first region)
11b outer region (second region)
12 notch
13 high-frequency current source
14 shortening capacitor (capacitor)
2 wireless tag
21 paper battery

The invention claimed is:

1. An antenna comprising:
a conductor plate having a notch, the conductor plate being divided into a first region and a second region by the notch and having a power feed point at one end of the notch; and
a capacitor that bridges the first region and the second region,
wherein the notch is a ribbon-shaped notch, and
a capacitance of the capacitor is set so as to be not less than 0.5×Co but not greater than 1.5×Co, where Co [F] is C obtained by substituting d=W into the following Equation (A):

$$C = \frac{1}{120\pi f\left\{\ln\left(\frac{4h}{d}\right) - 1\right\}} \tan\left\{\frac{2\pi}{\lambda}\left(\frac{\lambda}{4} - h\right)\right\} [F] \quad (A)$$

wherein f [Hz] is a resonant frequency of the antenna, $\lambda$ [m] is a resonant wavelength of the antenna found from $\lambda=c/f$ where c is the speed of light, h [m] is a total length of the notch, and W [m] is a mean width of the notch.

2. The antenna according to claim 1, wherein the first region and the second region of the conductor plate are provided on a single planar substrate.

3. The antenna according to claim 1, wherein:
the conductor plate is provided within a rectangular region of equal to or smaller than 85.6 mm×54.0 mm; and
a resonant frequency of the antenna is equal to or lower than 322 MHz.

4. The antenna according to claim 1, wherein:
the notch is a U-shaped notch; and
the conductor plate is divided, by the notch, into (i) the first region which is a rectangular region surrounded by the notch and (ii) the second region which is a U-shaped region surrounding the notch.

5. The antenna according to claim 4, wherein the U-shaped notch includes three linear parts made up of two parallel linear parts and the other one linear part, the other one linear part being longer than each of the two parallel linear parts.

6. The antenna according to claim 1, wherein at least part of the notch has a meander shape.

7. The antenna according to claim 1, wherein
a total length of the notch is less than $\lambda/4$ where $\lambda$ is a resonant wavelength of the antenna.

8. The antenna according to claim 1, wherein the first region and the second region are provided on an identical plane.

9. The antenna according to claim 2, wherein one of the first and second regions is on a back surface of the planar substrate and the other is provided on a front surface of the planar substrate.

10. The antenna according to claim 2, wherein:
the planar substrate is a multilayer substrate;
the first region of the conductor plate is provided on a first layer that is an inner layer or an outer layer of the planar substrate; and
the second region of the conductor plate is provided on a second layer that is an inner layer or an outer layer of the planar substrate, the second layer being other than the first layer.

11. A wireless tag comprising an antenna recited in claim 1.

12. A wireless tag according to claim 11, further comprising a battery,
wherein the conductor plate and the battery are provided within a rectangular region of equal to or smaller than 85.6 mm×54.0 mm such that they do not overlap each other.

13. The wireless tag according to claim 11, which has a shape of a card.

* * * * *